(12) United States Patent
Iwasaki et al.

(10) Patent No.: US 7,570,552 B2
(45) Date of Patent: Aug. 4, 2009

(54) OPTICAL DISK APPARATUS WHICH CHANGES A TILT VALUE OF AN OBJECTIVE LENS AND METHOD OF RECORDING WITH SUCH OPTICAL DISK APPARATUS

(75) Inventors: Satoshi Iwasaki, Tamana (JP); Shinji Matsumoto, Tamana (JP); Hideyuki Fujishima, Fukuoka (JP)

(73) Assignee: Panasonic Corporation, Osaka (JP)

( * ) Notice: Subject to any disclaimer, the term of this patent is extended or adjusted under 35 U.S.C. 154(b) by 727 days.

(21) Appl. No.: 11/042,201

(22) Filed: Jan. 26, 2005

(65) Prior Publication Data

US 2005/0162998 A1 Jul. 28, 2005

(30) Foreign Application Priority Data

Jan. 27, 2004 (JP) ............... 2004-017894

(51) Int. Cl.
*G11B 7/00* (2006.01)
(52) U.S. Cl. .................................. 369/44.32
(58) Field of Classification Search ........... None
See application file for complete search history.

(56) References Cited

U.S. PATENT DOCUMENTS

| 6,434,096 | B1 * | 8/2002 | Akagi et al. | 369/44.32 |
| 7,190,645 | B2 * | 3/2007 | Yoshimoto | 369/44.32 |
| 2003/0058758 | A1 * | 3/2003 | Takeda | 369/44.32 |
| 2005/0128902 | A1 * | 6/2005 | Tsai | 369/44.32 |
| 2006/0062107 | A1 * | 3/2006 | Iwasa | 369/44.32 |

FOREIGN PATENT DOCUMENTS

| JP | 05114154 | 5/1993 |
| JP | 10-289451 | 10/1998 |
| JP | 11-096566 | 4/1999 |
| JP | 2001-052361 | 2/2001 |
| JP | 2001195763 | 7/2001 |
| JP | 2001-357554 | 12/2001 |
| JP | 2002-092903 | 3/2002 |
| JP | 2003/0031364 | 2/2003 |
| JP | 2003-115123 | 4/2003 |
| JP | 2003-224727 | 8/2003 |
| JP | 2003-272204 | 9/2003 |

OTHER PUBLICATIONS

Japanese Office Action dated Oct. 14, 2008 with English Translation thereof.

* cited by examiner

*Primary Examiner*—Joseph Feild
*Assistant Examiner*—Joseph Haley
(74) *Attorney, Agent, or Firm*—Dickinson Wright, PLLC

(57) ABSTRACT

During recording with an optical disk apparatus, an objective lens is moved toward the inner circumference and outer circumference of an optical disk in the radial direction thereof and also moved upward and downward, and the quantity of reflected light is measured at that time. Quantities of reflected light are determined taking advantage of the characteristic of laser heat that it is most efficiently used to provide the smallest quantity of reflected light when the relationship between the optical disk surface and the objective lens is closest to perpendicularity and when they are at a distance at which the point in focus is most closely approached. An optimum tilt value and focus position are learned from the result of the determination to allow operations to be performed at the optimum tilt and the optimum position of the point in focus.

17 Claims, 15 Drawing Sheets

PATTERN 1: CURRENT POSITION AGREES WITH POINT IN FOCUS
PATTERN 2: POINT IN FOCUS IS LOWER THAN CURRENT POSITION
PATTERN 3: POINT IN FOCUS IS HIGHER THAN CURRENT POSITION

A: QUANTITY OF REFLECTED LIGHT IN CURRET FOCUS POSITION
B: QUANTITY OF REFLECTED LIGHT OBTAINED WHEN OBJECTIVE LENS IS MOVED UPWARD BY 0.06μm FROM CURRENT FOCUS POSITION
C: QUANTITY OF REFLECTED LIGHT OBTAINED WHEN OBJECTIVE LENS IS MOVED DOWNWARD BY 0.06μm FROM CURRENT FOCUS POSITION

FIG. 15

| RADIAL POSITION | 20mm | 21mm | 22mm | 23mm | 24mm | 25mm | 26mm | ... | 60mm |
|---|---|---|---|---|---|---|---|---|---|
| PERMIT/ INHIBIT | INHIBITED | INHIBITED | INHIBITED | INHIBITED | PERMITTED | PERMITTED | PERMITTED | ... | PERMITTED |

FIG. 16

| RADIAL POSITION | 20mm | 21mm | 22mm | 23mm | 24mm | 25mm | 26mm | ... | ... | 60mm |
|---|---|---|---|---|---|---|---|---|---|---|
| ACQUIRED/ UNACQUIRED | | | | | | | | ... | ... | |
| TILT VALUE | | | | | | | | ... | ... | |
| TEMPERATURE | | | | | | | | ... | ... | |

OPTICAL DISK APPARATUS WHICH CHANGES A TILT VALUE OF AN OBJECTIVE LENS AND METHOD OF RECORDING WITH SUCH OPTICAL DISK APPARATUS

BACKGROUND OF THE INVENTION

The present invention relates to an optical disk apparatus for recording and reproducing information in and from an optical disk and a method of recording with an optical disk apparatus in which a relationship between an optical disk and a tilt and a focus offset of an objective lens of an optical pickup is controlled.

An optical disk cannot be formed with a perfect circular configuration that is completely flat and concentric because of limitations on processes for forming the optical disk. That is, optical disks in the market include optical disks having a center hole that is off the center and optical disks having a warp at the outer circumference thereof. Recently, there are media referred to as printable media on which printing can be performed on a label surface thereof using an inkjet printer. A dedicated material to allow printing using an inkjet printer is applied to the label surface of a printable medium. The material deforms a polycarbonate plate of an optical disk because it has the property of expanding and shrinking depending on temperature changes. Consequently, a printable medium has the property of being warped in the radial direction of the optical disk by a temperature change. There is variation of optimum recording power for achieving optimum recording quality on such an optical disk because the way of irradiation of the optical disk surface with laser light varies while the laser power is kept constant. Therefore, a process referred to as running OPC (optimum power calibration) has been established as a measure to keep the optimum recording power constant on the optical disk surface by varying the recording power emitted from the laser. Further, a process referred to as full-surface tilt learning has been established to deal with optical disks which are warped at the time of formation of the same.

An optical disk apparatus has a focus servo mechanism for maintaining a constant distance between an objective lens and an optical disk such that laser light converged by the objective lens for recording and reproduction of data will be focused on a recording surface of the optical disk. The balance between outputs from detectors for two reflected beams of light is used as an input to such a focus servo mechanism, and the point in focus is located on the recording surface of the optical disk by keeping the balance constant. However, a shift of such input balance is caused by an electrical offset that is primarily attributable to a temperature change. Such a shift results in a change in the distance that is controlled by the focus servo mechanism, and recording and reproduction will consequently be performed with the point in focus located out of the recording surface of the optical disk. Thus, the quantity of laser light per unit area decreases, which results in a need for increasing the laser power. In order to avoid such a situation, a process of focus position learning is performed, in which a recorded area of an optical disk is reproduced when an optical disk apparatus is activated to find a focus offset value that provides an optimum jitter value and in which temperature changes are detected to find a proper focus offset value again when there is a predetermined temperature change. However, since such focus position learning process is not performed during recording, a shift of the point in focus attributable to a temperature change cannot be avoided when there is a temperature increase during recording.

In this connection, a configuration of an optical disk apparatus according to the related art will be first described with reference to FIGS. 2, 3, 4A, 4B, 4C, 13, and 14. FIG. 2 is a waveform diagram showing reflected light from an optical disk during recording. FIG. 3 shows a relationship between a warp of an optical disk in the radial direction thereof and an objective lens of an optical disk apparatus. FIGS. 4A to 4C show a surface of an optical disk and focal distances. FIG. 13 is a block diagram showing tilt/focus control of an objective lens according to the related art. FIG. 14 is a block diagram showing laser control of an optical disk apparatus according to the related art.

In FIG. 13, reference numeral 101 represents an optical disk; reference numeral 102 represents a pickup module; reference numeral 103 represents a spindle motor; reference numeral 104 represents a focus drive coil; reference numeral 105 represents an objective lens; reference numeral 106 represents a focus drive unit; reference numeral 107 represents a focus control unit; reference numeral 108 represents a tilt value calculation unit; and reference numeral 109 represents a digital servo controller. Full-surface tilt learning at a tilt control unit having a configuration as described above will now be described with reference to FIG. 13.

When the optical disk 101 is inserted into the optical disk apparatus, the focus control unit 107 of the optical disk apparatus sends a signal to the focus control unit 106 such that laser light exiting the objective lens 105 in the pickup module 102 is focused on the optical disk 101. Upon receipt of the signal, the focus control unit 106 passes a predetermined current through the focus drive coil 104 to move the objective lens 105 up and down, thereby activating focus servo. The spindle motor 103 is thereafter rotated to increase the speed of rotation of the optical disk to a predetermined value. Let us now assume that a region of the optical disk ranging between radial positions of 23 mm and 56 mm is thereafter equally divided at eight points and that the eight points are represented by A, B, C, D, E, F, G, and H in the order listed starting with the point closest to the inner circumference of the disk. Then, a focus drive value at which each of the points becomes the point in focus is obtained. Such values are represented by Af, Bf, Cf, Df, Ef, Ff, Gf, and Hf, respectively. Referring to the first two points A and B and the values Af and Bf, the distance between the two points is given by B-A, and the difference between the focus drive values at those points is given by Bf-Af which also gives a height difference between the points A and B of the optical disk. It is therefore possible to obtain the angle of a warp of the optical disk that is present between the two points A and B at the tilt value calculation unit 108 in the digital servo controller 109. Similarly, the angles of warps of the optical disk that are present between the points B and C and between the points C and D can be obtained. As a result, the angle of a warp on the entire surface of the optical disk is obtained. Learning is conducted prior to a series of recording operations according to the result such that the objective lens 105 will be tilted perpendicularly to the optical disk surface. Such learning for tilting the objective lens 105 perpendicularly to the optical disk surface to deal with a warp that occurs at the time of formation of the optical disk is referred to as full-surface tilt learning.

Focus position learning will now be described.

Referring to the section of the optical disk 101 in FIGS. 4A, 4B, and 4C, it is constituted by a protective layer 101a, a recording surface 101c on which data are recorded, and a recording layer 101b. When data are recorded or read in the optical disk 101, the point in focus 100 of laser light must be set on the recording surface 101c as shown in FIG. 4A, and it is not preferable that the point in focus 100 is shifted from the recording surface 101c as shown in FIGS. 4B and 4C.

An optical disk apparatus starts an activation process when an optical disk is inserted. At this time, the objective lens is moved to a region of the optical disk where recording has already been performed, and a jitter value is measured while the recorded data are read. The jitter is measured at each of a plurality of points in the focused position, and the point at which the jitter is lowest is stored as an optimum position of the point in focus (FIG. 4A). When a temperature change is detected after the activation process, the focus position learning based on jitter measurement is carried out again.

A running OPC process for maintaining optimum recording power on a surface of an optical disk will now be described with reference to FIG. 14.

Referring to FIG. 14, reference numeral 101 represents an optical disk; reference numeral 102 represents a pickup module; reference numeral 103 represents a spindle motor; reference numeral 114 represents a laser diode; reference numeral 105 represents an objective lens; reference numeral 116 represents a reflected light receiving unit; reference numeral 117 represents a reflected light calculation unit; reference numeral 118 represents a reflected light detection unit; reference numeral 119 represents a reflected light A-D conversion unit; reference numeral 120 represents a reflected light A-D-converted value calculation unit; reference numeral 121 represents a reflected light A-D-converted value comparison unit; reference numeral 122 represents a laser power control unit; reference numeral 123 represents a laser driving current conversion unit; and reference numeral 124 represents a laser drive unit. A running OPC process involving the above-described configuration will now be described.

When recording on the optical disk 101 is started, the reflected light receiving unit 116 in the optical pickup module 102 receives beams of reflected light from the optical disk 101. The reflected light calculation unit 117 totals the signals received by the receiving unit to generate an overall reflected light signal (RF signal). The reflected light A-D conversion unit 119 converts voltage values at levels A, B, C, and k, as shown in FIG. 2, of the RF signal detected by the reflected light detection unit 118 into digital signals which are then calculated by the reflected light A-D-converted value calculation unit 120 as amounts of change in the thermal efficiency of power radiated to the optical disk 101 during recording. The levels A, B, and C in FIG. 2 indicate instants at which an organic coloring matter in the optical disk is thermally decomposed by the heat of the laser power during recording, and there is a characteristic that the quantity of reflected light decreases as the thermal decomposition proceeds. Thus, the level C appears when the recording power is efficiently applied to the optical disk surface, and the level increases to the levels B and A as the efficiency becomes worse. Therefore, the reflected light A-D-converted value comparison unit 121 calculates differences between the levels A, B, and C in FIG. 2, calculates amounts of power correction for canceling the differences, and outputs corrected power signals to the laser power control unit 122. The laser power control unit 122 outputs digital signals which actually change the laser power. The digital signals are changed by the laser drive current conversion unit 123 into current values which are then transmitted to the laser driving unit 124 for switching the laser power of the laser diode 114 in the optical pickup module, whereby control is performed to keep the optimum recording power constant during recording.

Examples of the related art are described in JP-A-2001-195763 or JP-A-5-114154.

When recording is actually started by an optical disk apparatus according to the related art after full-surface tilt learning is conducted at the time of insertion of an optical disk, heat generated by ICs themselves in the drive results in a temperature rise of about 25° C. on average in the drive if the recording is performed on the entire surface of the optical disk. In the case of a printable medium as described above, the optical disk begins to warp at the time when recording is started on the entire surface thereof after full-surface tilt learning upon activation, the warping proceeding with a temperature rise during recording. The state of the warp becomes different from the result of the full-surface tilt learning conducted at the time of activation, and a perpendicular positional relationship between the optical disk surface and the optical axis of the laser is lost. As a result, marks formed on the optical disk will become uneven in the radial direction of the optical disk as indicated by FIG. 5 which shows marks formed on an optical disk according to the related art. Thus, asymmetry characteristics reflecting the characteristics of recording power as shown in FIG. 6 are degraded near the outer circumference of the optical disk, FIG. 6 being a graph showing degradation of quality of recording on an optical disk according to the related art having a warp. A problem consequently arises in that the number of reproduction errors increases near the outer circumference of the optical disk as shown in FIG. 6.

Focus position learning according to the related art is a method of obtaining an optimum position based on a jitter value, and this method cannot be carried out during recording. Since recording involves higher laser power and therefore results in generation of higher heat compared to reproduction, a balance value that determines a focus position can be shifted by a temperature change. A problem therefore arises during recording in that recording quality is degraded because recording is continued with the focus position shifted.

When control over optimum recording power is conducted using a running OPC process, in the case of the above-described printable medium, the perpendicular relationship between the optical disk surface and the optical axis of the laser is eliminated by a warp of the medium attributable to a temperature rise, and the thermal efficiency of the laser is thereby reduced. As a result, there are increases from the level C to the levels A and B in FIG. 2, and the laser power is increased to suppress the amounts of such changes. However, when there is a great shift from the perpendicular relationship with the optical disk surface, only one side of a mark will be formed with high intensity as shown in FIG. 5 by simply increasing the laser power. Since the other side of the mark is therefore formed with lower clarity, a problem arises in that there is a high possibility of a reading error when the mark thus recorded is reproduced.

When there is a shift of a focus position, a running OPC mechanism detects a reduction in the thermal efficiency of the laser and increases the laser power. However, laser light will then irradiate an improperly wide range because the point in focus is not on the recording surface of the optical disk. Jitter during reproduction will therefore become worse, and this can result in increased errors.

Further, in the case of an optical disk for recording whose recording pits are formed with wobbles to provide address information on the optical disk, light is differently returned from the left and right sides of a pit when a perpendicular relationship between the optical disk surface and the optical axis of the laser is lost. As a result, a problem arises in that the address information on the optical disk may not be detected during recording and a recording error can occur in the worst case.

BACKGROUND OF THE INVENTION

The invention has been made to solve the above-described problems, and it is an object of the invention to provide an optical disk apparatus in which the positional relationship between a surface of an optical disk and the optical axis of a laser is prevented from shifting from perpendicularity and in which the occurrence of a shift of a focus position attributable to a temperature change is prevented, whereby no degradation of recording quality will occur and any recording error will not be caused by a failure in detecting an address on an optical disk during recording.

In order to achieve the above-described object, an optical disk apparatus according to the invention comprises a light-receiving unit for receiving reflected light from an optical disk under recording, a calculation unit for performing a calculation on the received signal, a detection unit for detecting the calculation result, an A-D conversion unit for performing A-D conversion of the detected signal, an A-D-converted signal calculation unit for performing a calculation on the A-D-converted signal, a calculation result comparison unit for performing a comparison on the calculation result, a tilt value calculation unit for calculating a tilt value for an objective lens of an optical pickup from the result of comparison at the calculation result comparison unit, and a focus control unit and a focus drive unit for operating the objective lens of the optical pickup based on the result of the calculation. The optical disk apparatus is configured to receive reflected light during recording from an optical disk which is warped by a temperature rise during the recording operation, to recognize the direction in which the relationship between a surface of the optical disk and the optical axis of a laser is shifted from perpendicularity from a change in the signal received, to operate the objective lens of the optical pickup such that the perpendicular relationship is approached, and to correct any shift of a focus position by recognizing any shift from the position of a point in focus between the optical disk surface and the objective lens from a change in the signal received.

According to the invention, the above-described configuration makes it possible to conduct full-surface tilt learning at the time of activation on a printable medium that can be warped by an internal temperature increase during a recording operation. It is thus possible to prevent the positional relationship between a surface of the optical disk and the optical axis of the laser from shifting from perpendicularity to cause degradation of recording quality and a recording error attributable to a failure in detecting address information on an optical disk, such a shift being caused by warping of the optical disk which starts when recording is started on the entire surface of the disk and proceeds as the temperature increases during recording to reach a state of warping different from the result of the full-surface tilt learning conducted at the time of activation. Degradation of recording quality can be also avoided by correcting a positional shift of a point in focus that occurs between the optical disk surface and an objective lens. It is therefore possible to provide an optical disk apparatus which can perform stable recording operations and achieve stable recording quality.

BRIEF DESCRIPTION OF THE DRAWINGS

FIG. 15 is a table showing tilt/focus control permit/inhibit states associated with radial positions of an optical disk; and FIG. 16 is a table showing tilt value acquired/unacquired states, tilt values, and temperatures at the time of the acquisition of the tilts associated with radial positions of an optical disk.

DETAILED DESCRIPTION OF THE PREFERRED EMBODIMENTS

Embodiment 1

Figure 1:
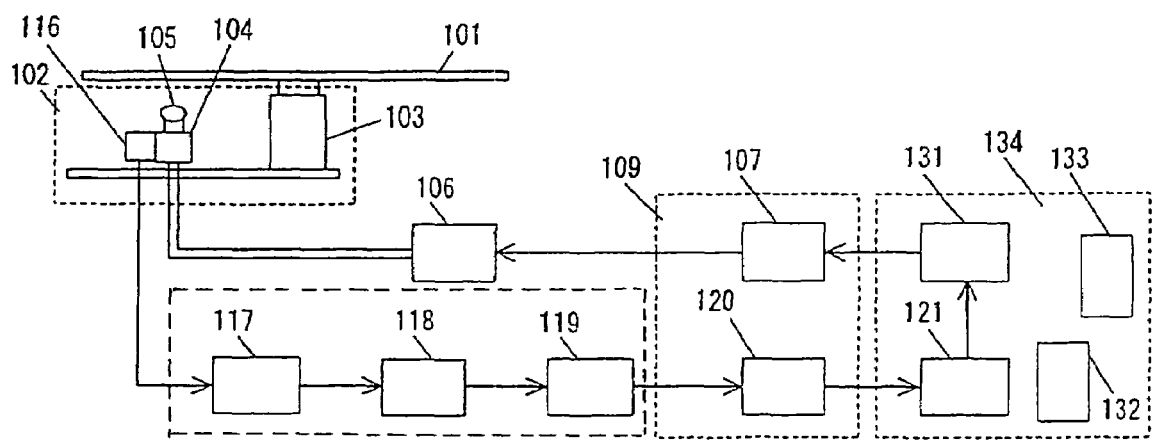
FIG. 1 is a block diagram of tilt control and focus control of an optical disk apparatus in an embodiment of the invention.
Figure 2:
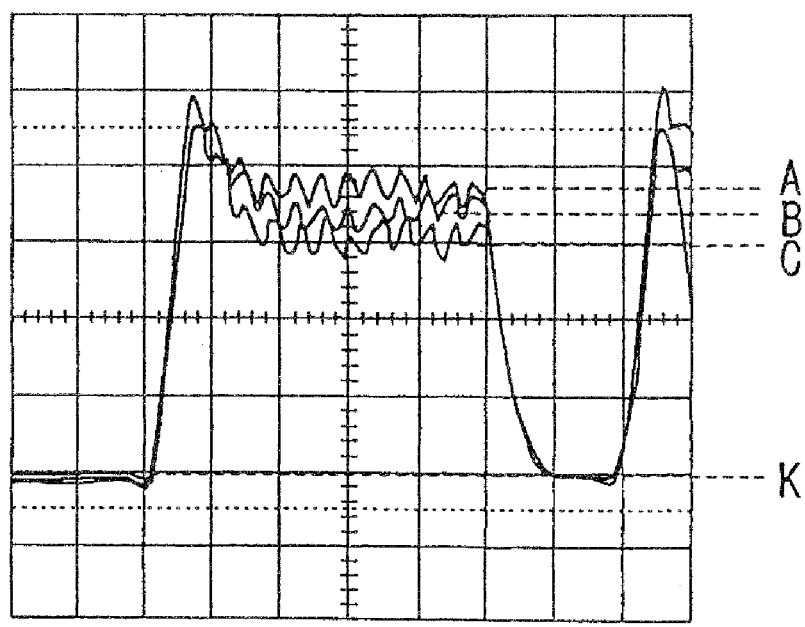
FIG. 2 is a waveform diagram showing reflected light from an optical disk during recording.
Figure 3:
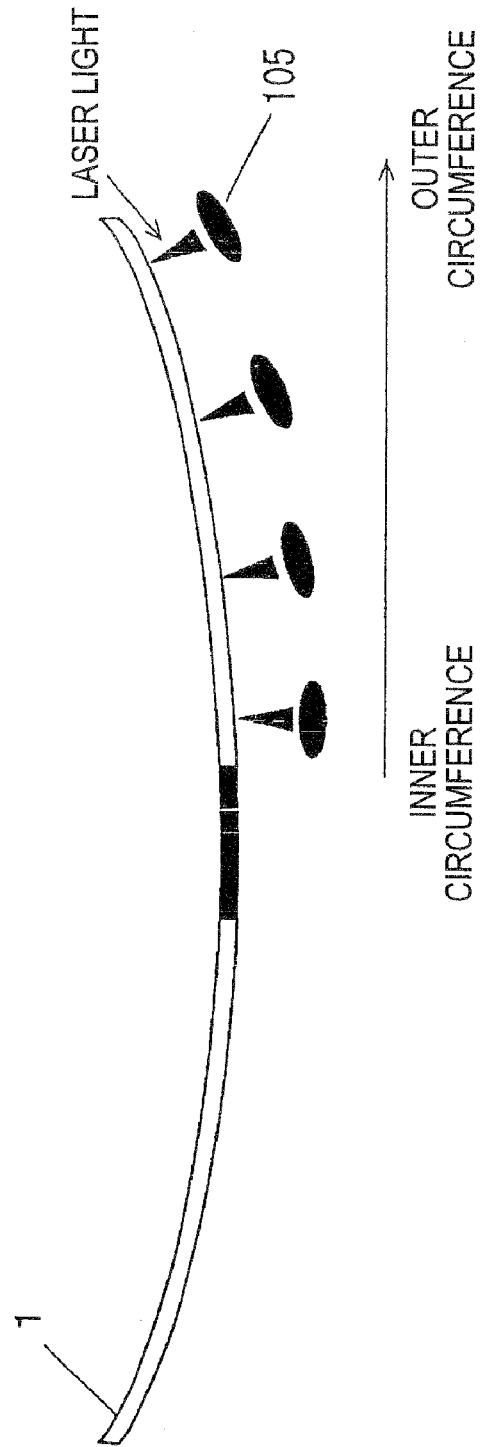
FIG. 3 shows a relationship between a warp of an optical disk in the radial direction thereof and an objective lens of an optical disk apparatus.
Figure 4A:
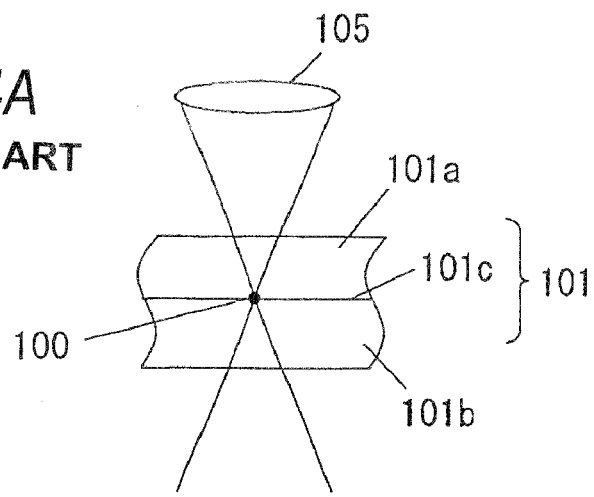
FIGS. 4A to 4C show a surface of an optical disk and focal distances.
Figure 4B:
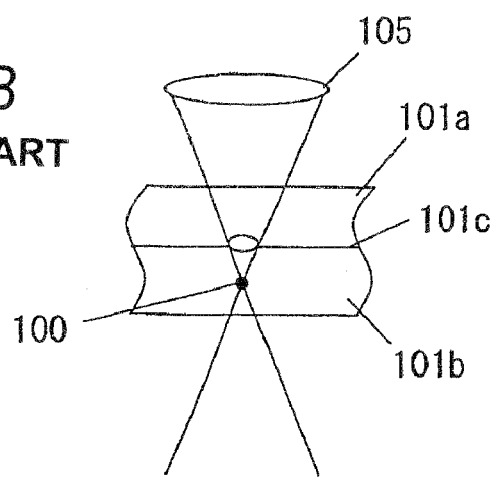
Figure 4C:
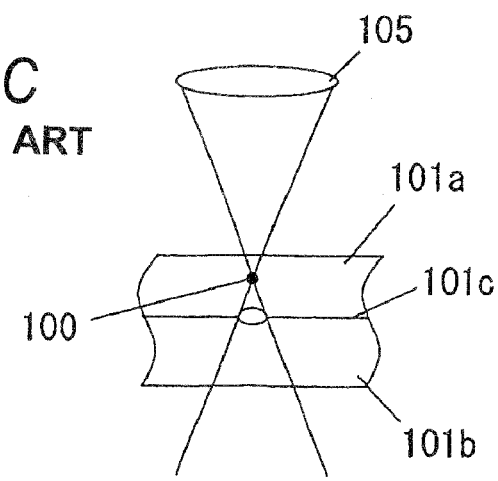
Figure 5:
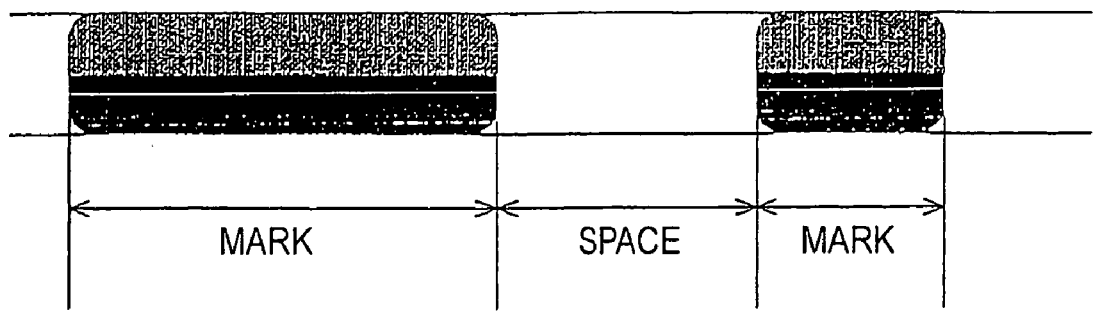
FIG. 5 shows marks formed on an optical disk according to the related art.
Figure 6:
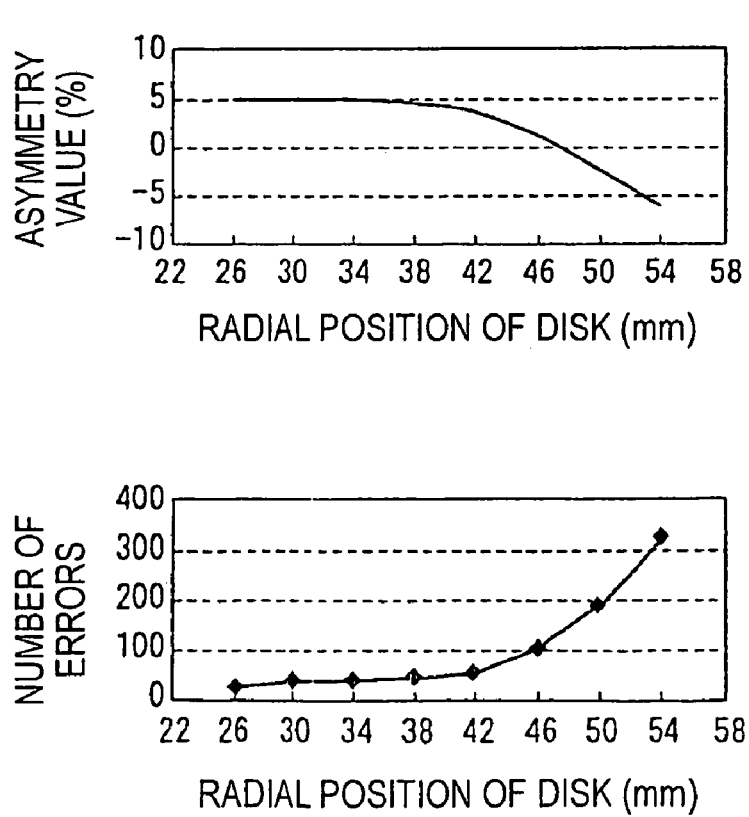
FIG. 6 is a graph showing degradation of recording quality on an optical disk according to the related art having a warp.

FIG. 1 is a block diagram of tilt control and focus control in an optical disk apparatus in an embodiment of the invention. Referring to FIG. 1, reference numeral 101 represents an optical disk; reference numeral 102 represents a pickup module; reference numeral 103 represents a spindle motor; reference numeral 104 represents a focus drive coil; reference numeral 105 represents an objective lens; reference numeral 116 represents a reflected light receiving unit; reference numeral 117 represents a reflected light calculation unit; reference numeral 118 represents a reflected light detection unit; reference numeral 119 represents a reflected light A-D conversion unit; reference numeral 120 represents a reflected light A-D-converted value calculation unit; reference numeral 121 represents a reflected light A-D-converted value comparison unit; reference numeral 131 represents a calculation unit which calculates tilt values and focus values; reference numeral 107 represents a focus control unit; reference numeral 106 represents a focus drive unit; reference numeral 132 represents a storing unit which stores a tilt correction result, disk radial position, and temperature; reference numeral 133 represents a recognition unit which recognizes permit or inhibit of tilt/focus control; reference numeral 109 represents a digital servo controller; and reference numeral 134 represents a CPU.

The digital servo controller 109 constitutes control units according to the invention, and it includes the focus control unit 107 and the A-D-converted value calculation unit 120. An optical disk controller MN103S42F manufactured by Semiconductor Company, Matsushita Electric Industrial Co., Ltd. is used as the digital servo controller 109 to provide its control functions. Referring to the specifications of the optical disk controller MN103S42F, it has maximum recording speeds 4× DVD-RAM, 4× DVD-R, 4× DVD-RW, 24× CD-R, and 10× CD-RW and maximum reproduction speeds 16× DVD-ROM, 4× DVD-RAM, and 48× CD.

The calculation unit 131 which sends information to the focus control unit 107 is configured in the CPU 134 along with the reflected light A-D-converted value comparison unit 121, the storing unit 132, and the recognition unit 133. A 16-bit microcomputer MN102H730F having a maximum internal operating frequency of 17 MHz manufactured by Semiconductor Company, Matsushita Electric Industrial Co., Ltd. is used as the CPU 134 to provide its control functions. The CPU 134 comprising a 16-bit microcomputer MN102H730F manufactured by Semiconductor Company, Matsushita Electric Industrial Co., Ltd. incorporates a RAM in which values indicating results of learning activated when the optical disk is powered on and loaded with an optical disk are stored and maintained until learning is needed again as a result of the replacement of the optical disk.

A chip TPIC1329DBT manufactured by Texas Instruments Japan Ltd. is used as the focus drive unit 106 which operates on information received from the focus control unit 107, and a product of Panasonic Communications Co., Ltd. is used as a focus drive coil.

Referring to other conditions, the reflected light calculation unit 117, the reflected light detection unit 118, and the reflected light A-D conversion unit 119 are configured in a front end processor LSI AN22110A for CD/DVD manufactured by Semiconductor Company, Matsushita Electric Industrial Co., Ltd. The front end processor LSI AN22110A for CD/DVD manufactured by Semiconductor Company, Matsushita Electric Industrial Co., Ltd. allows recording and reproduction of a DVD-R, DVD-RW, DVD-RAM, CD-R, or CD-RW and allows reproduction of a DVD-ROM or CD-ROM.

When the optical disk 101 is inserted into the optical disk apparatus, the spindle motor 103 is rotated to start an activation process. At this time, the objective lens 105 in the pickup module 102 is moved to a region of the optical disk where recording has already been performed, and a jitter value is measured when the recorded data are read. The jitter is measured at each of a plurality of points in the focused position, and the point at which the jitter is lowest is stored as an optimum focus position. When a temperature change is detected after the activation process, the focus position learning based on jitter measurement is carried out again.

The optical disk apparatus then conducts full-surface tilt learning.

When the focus position learning is completed, the optical disk apparatus equally divides a region of the optical disk ranging between radial positions of 23 mm and 56 mm at eight points. On an assumption that the eight points are represented by A, B, C, D, E, F, G, and H in the order listed starting with the point closest to the inner circumference of the disk, a focus drive value at which each of the points comes to a focus is obtained. Such values are represented by Af, Bf, Cf, Df, Ef, Ff, Gf, and Hf, respectively. Referring to the first two points A and B and the values Af and Bf, the distance between the two points is given by B−A, and the difference between the focus drive values at those points is given by Bf−Af which also gives a height difference between the points A and B of the optical disk. It is therefore possible to obtain the angle of a warp of the optical disk that is present between the two points A and B. Similarly, the angles of warps of the optical disk that are present between the points B and C and between the points C and D can be obtained. Thus, tilt angles at respective radial positions of the disk are obtained in advance on the entire surface of the optical disk using the focus value calculation unit 131. When the focus position learning and full-surface tilt learning is conducted, the optical disk apparatus simultaneously obtains the temperature at that time.

When the series of activation processes is completed, the optical disk apparatus enters a recording operation. First, an OPC (optimum power calibration) operation is performed to obtain optimum recording power for the optical disk. The OPC operation utilizes an area referred to as a PCA (power calibration area) area which is provided inwardly of a data region of an optical disk and which is provided to perform the same operation. Recording is performed in the area while varying the recording power at a plurality of steps, and signals thus recorded are reproduced to calculate optimum recording power from the reproduced signals.

When optimum recording power is identified, the optical disk apparatus starts recording of data in an actual data area. After recording is started, a normal recording operation is performed for 100 ECC (1 ECC=37865 bytes). When recording of 100 ECC is completed, the optical disk apparatus measures the quantity of reflected light from the optical disk at the current tilt value (this value is a value which has been obtained by the full-surface learning at the time of activation). The measurement is carried out such that the reflected light calculation unit 117 calculates reflected light obtained by the reflected light detection unit 116 shown in FIG. 1 and the reflected light detection unit 118 detects only a required signal from the calculation result. Subsequently, the reflected light signal obtained by the reflected light detection unit 118 is subjected to A-D conversion at the reflected light A-D conversion unit 119, transmitted to the reflected light A-D-converted value calculation unit 120, and stored in the storing unit 132 as reflected light quantity data at the initial tilt value. Referring to the reflected light sampling time, reflected light during three turns of the optical disk is acquired. The purpose is to eliminate any variation of data attributable to axial runout components of the optical disk by acquiring data of three turns. Tilt correction during data recording is performed only in the data area, and the recognition unit 133 checks values on a table indicating permit/inhibit states of the tilt/focus control for respective radial positions of the optical disk to enable the correction. In the case of the acquisition of the reflected light quantity data at the initial tilt value, since the table value indicates a permit state, it is recognized that tilt/focus control is permitted when the initial tilt value is acquired. When the reflected light quantity data value at the initial tilt value is obtained, the objective lens is tilted 0.025° in the radial direction of the optical disk toward the outer circumference thereof. Then, the quantity of reflected light is measured using the same approach as that used for acquiring the quantity of reflected light at the initial tilt value as described above, and data of the quantity of reflected light at that time is maintained. Subsequently, the objective lens is further tilted toward the outer circumference 0.025° (0.05° relative to the initial value), and the quantity of reflected light is then acquired and maintained using the same approach as described above. Subsequently, the lens is tilted toward the inner circumference 0.025° and 0.05°, and the quantity of reflected light is measured and maintained as described above. When the five quantities of reflected light at five tilt values have been thus obtained, the optical disk apparatus acquires the temperature at the present time.

Next, the optical disk apparatus determines the current positional relationship between the objective lens and the optical disk surface using the reflected light A-D-converted value comparison unit 121 from the data of the five quantities of reflected light obtained at five values of tilt relative to the optical disk to learn the tilt value at which the positional relationship is closest to perpendicularity.

Figure 7:
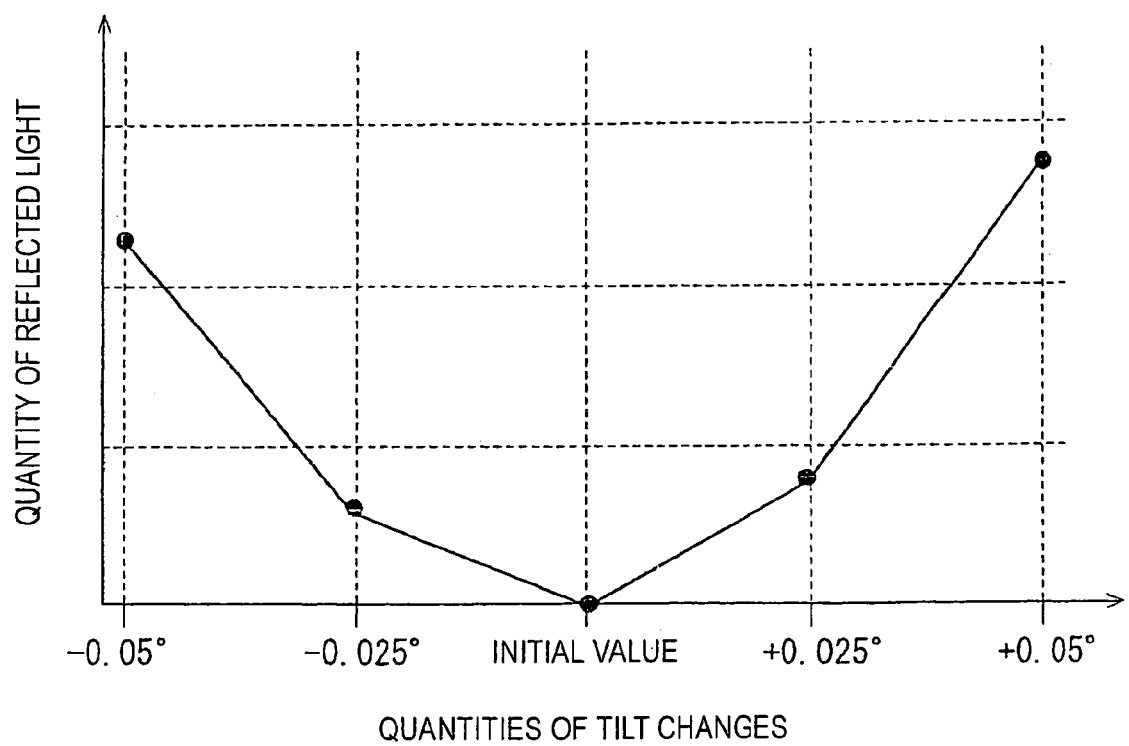
FIG. 7 shows quantities of reflected light obtained by varying the tilt of the objective lens of the embodiment of the invention in the radial direction of the optical disk, the tilts having no shift.
Figure 8:
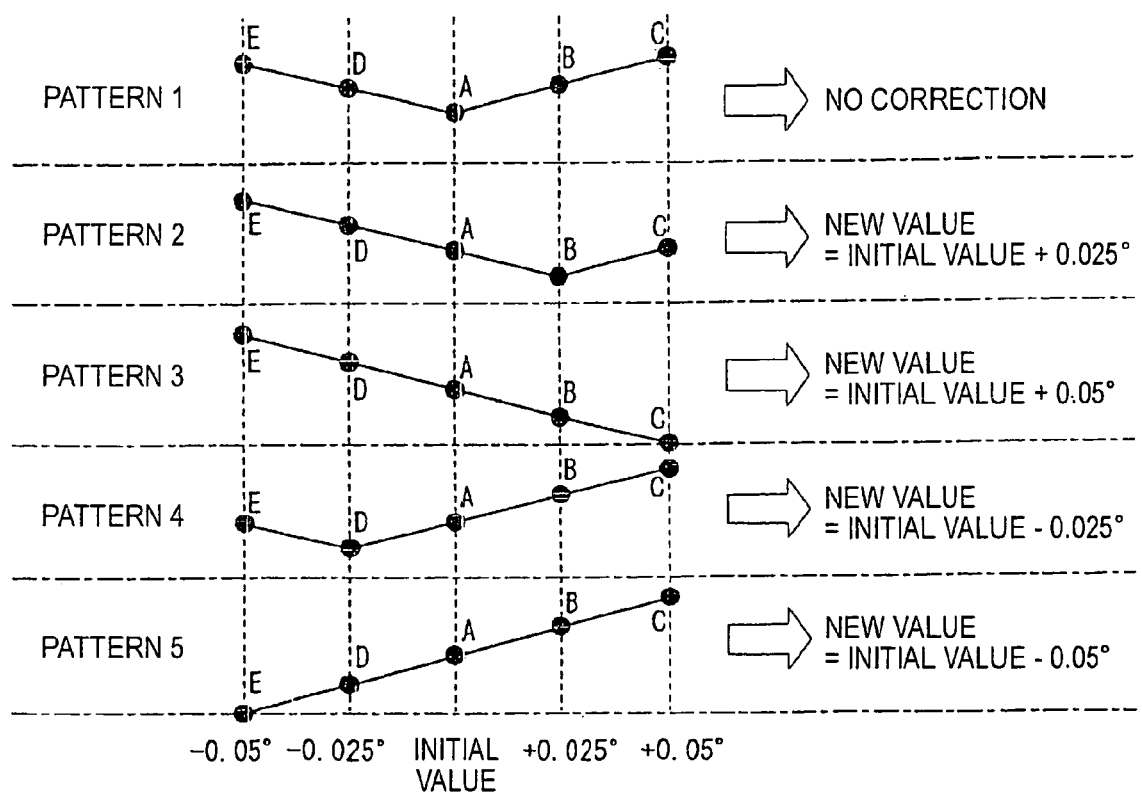
FIG. 8 shows quantities of reflected light obtained by varying the tilt of the objective lens of the embodiment of the invention in the radial direction of the optical disk.

FIG. 7 shows quantities of reflected light obtained by varying the tilt of the objective lens of the present embodiment of the invention in the radial direction of the optical disk, the tilts having no shift. The figure shows the relationship between quantities of reflected light obtained by varying the tilt value at ±0.025° and ±0.05° from the initial value and the quantities of respective tilt changes. FIG. 8 shows quantities of reflected light obtained by varying the tilt of the objective lens in the radial direction of the optical disk. The sign "+" indicates a tilt toward the outer circumference relative to a position in the radial direction of the optical disk, and the sign "−" indicates a tilt toward the inner circumference.

In general, the quantity of reflected light from the optical disk is smallest when the optical disk surface and the objective lens are in a perpendicular positional relationship because the disk is irradiated with the laser power with highest efficiency. The quantity of reflected light increases as the efficiency becomes lower because the heat of the laser is less efficiently transmitted. That is, the characteristics shown in FIG. 7 are obtained when the initial tilt value is optimal.

Only five patterns as shown in FIG. 8 are available for variation of tilt values at the five points when there is a shift of tilt. The values of quantities of reflected light at the respective tilt values are represented by A to E as shown in FIG. 8.

Figure 9:
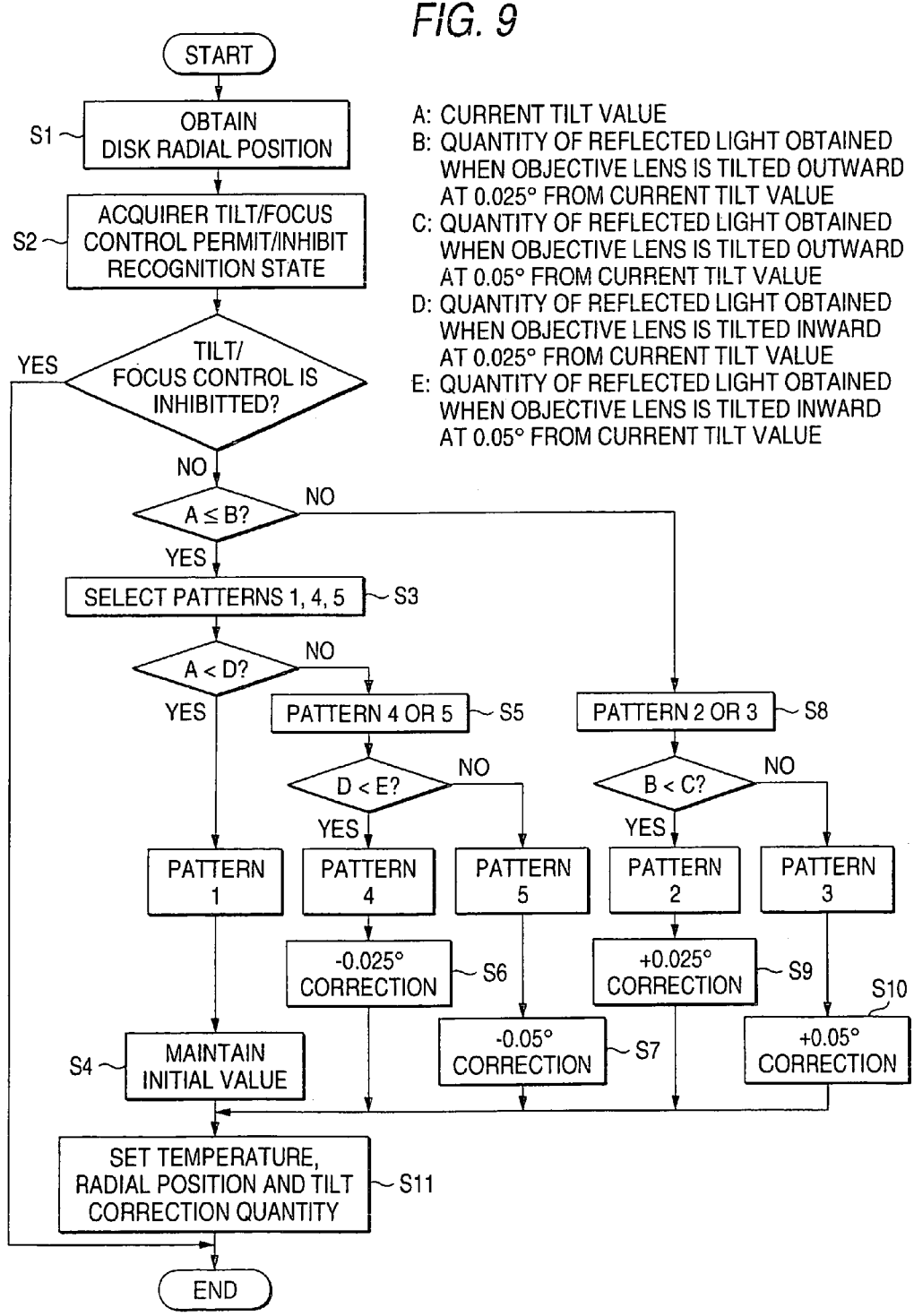
FIG. 9 is a flow chart showing a process of correcting the tilt of the objective lens relative to the optical disk in the embodiment of the invention into a perpendicular relationship.

Processing steps will now be described according to FIG. 9. FIG. 9 is a flow chart showing a process of correcting the tilt of the objective lens relative to the optical disk in the present embodiment of the invention into a perpendicular relationship.

The optical disk apparatus identifies the position where recording is started as a position in the radial direction of the optical disk (S1) and refers to the identification table indicating permit/inhibit of the tilt/focus control associated with radial positions of the optical disk shown in FIG. 15 to acquire the permit/inhibit identification state of the tilt/focus control relating to the radial position of the optical disk (S2). When tilt/focus control is inhibited, no tilt/focus process is performed. When tilt/focus control is permitted, the following process is performed.

First, the value A (the current tilt value) and the value B (the quantity of reflected light obtained when the objective lens is titled outward at 0.025° from the current tilt value) are compared by the reflected light quantity A-D-converted value comparison unit 121 shown in FIG. 1. When the value A is equal to or smaller than the value B, three patterns, i.e., patterns 1, 4, and 5 in FIG. 8 are selected (S3). Next, the value A and the value D (the quantity of reflected light obtained when the objective lens is titled inward at 0.025° from the current tilt value) are compared. When the value A is smaller than the value D, the tilt has the pattern 1 in which the positional relationship between the optical disk and the objective lens is closest to perpendicularity at the initial tilt value. Therefore, no correction is performed, and the initial tilt value becomes the result of learning (S4). When the value D is equal to or smaller than the value A, since the tilt has the pattern 4 or 5 (S5), the value D and the value E are compared. When the value D is smaller than the value E (the quantity of reflected light obtained when the objective lens is titled inward at 0.05° from the current tilt value), the tilt has the pattern 4. That is, the relationship between the optical disk and the objective lens is closest to perpendicularity at a tilt of −0.025°. Then, a signal for moving the objective lens 105 toward the inner circumference at 0.025° relative to the initial value is transmitted from the focus control unit 107 to the focus drive unit to correct the quantity of tilt of the objective lens (S6). When the value D is equal to or smaller than the value E, the tilt has the pattern 5. Then, a signal for moving the objective lens 105 toward the inner circumference at 0.05° relative to the initial value is transmitted from the focus control unit 107 to the focus drive unit to correct the quantity of tilt of the objective lens (S7).

When the comparison of the values A and B indicates that the value B is smaller, the tilt has the pattern 2 or 3 in FIG. 8 (S8). Then, the value B and the value C (the quantity of reflected light obtained when the objective lens is tilted outward at 0.05° from the current tilt value) are compared. When the value B is smaller than the value C, the tilt has the pattern 2. Then, a signal for moving the objective lens 105 toward the outer circumference at 0.025° relative to the initial value is transmitted from the focus control unit 107 to the focus drive unit to correct the quantity of tilt of the objective lens (S9). When the value B is greater than the value C, the tilt has the pattern C. Then, a signal for moving the objective lens 105 toward the outer circumference at 0.05° relative to the initial value is transmitted from the focus control unit 107 to the focus drive unit to correct the quantity of tilt of the objective lens (S10).

After the above-described process is completed, the optical disk apparatus acquires the current temperature, sets and maintains the "acquired/unacquired" state of the tilt correction result/disk radial position/temperature storing unit 132 as "acquired" in the table shown in FIG. 16 that shows whether a tilt value from the radial position of the optical disk has been acquired or not, the tilt value, and the temperature at the time of acquisition of the tilt value, and maintains the tilt value and the temperature at the time of the process of acquiring the tilt value (S11). The process thus described is performed during the recording operation, and recording is not interrupted.

Figure 11:
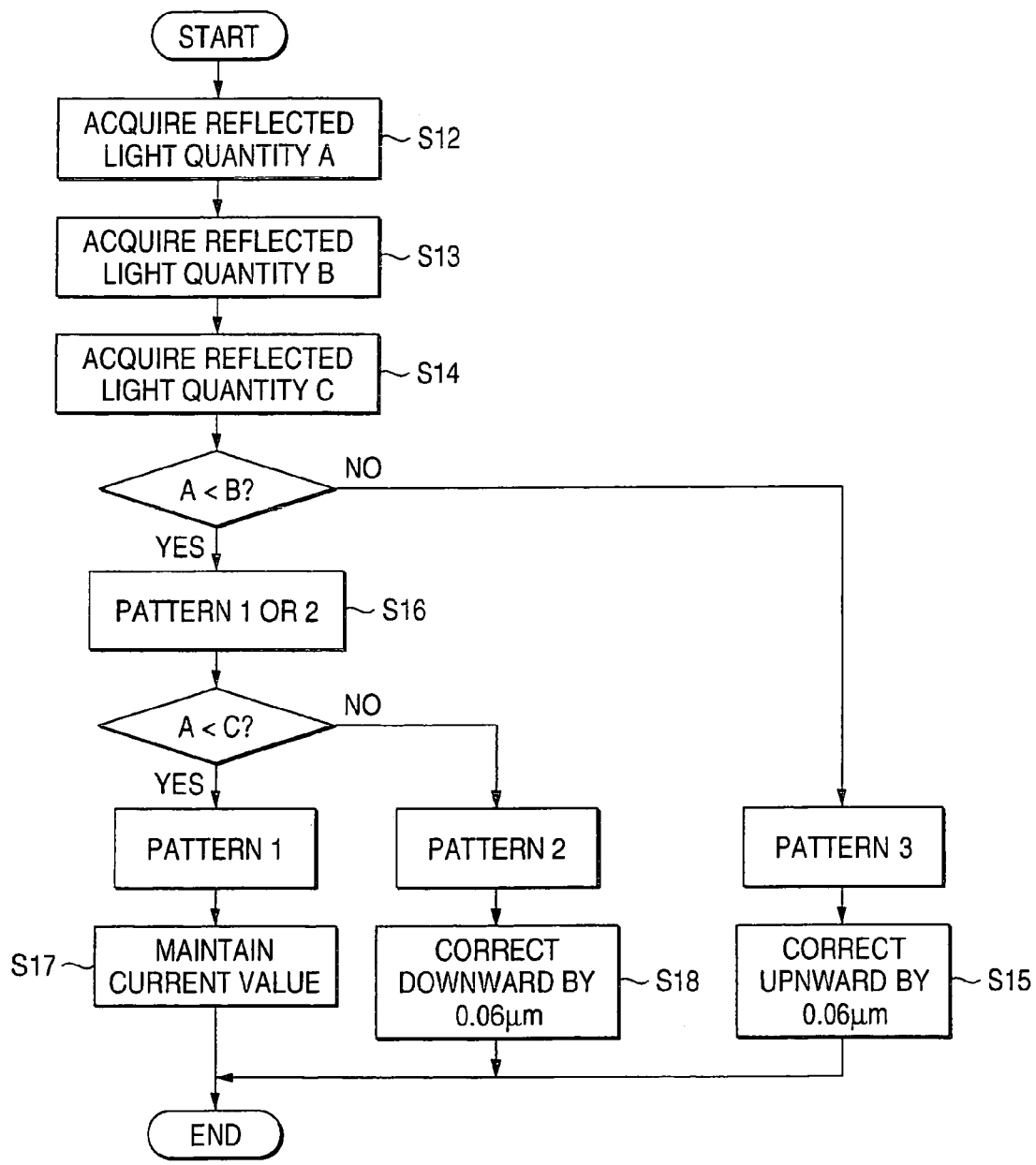
FIG. 11 is a flow chart showing a process of correcting a positional shift of a point in focus between the optical disk and the objective lens in the embodiment of the invention.

Processing steps will now be described according to FIG. 11. FIG. 11 is a flow chart showing a process of correcting a positional shift of a point in focus between the optical disk and the objective lens in the embodiment of the invention.

Figure 10:
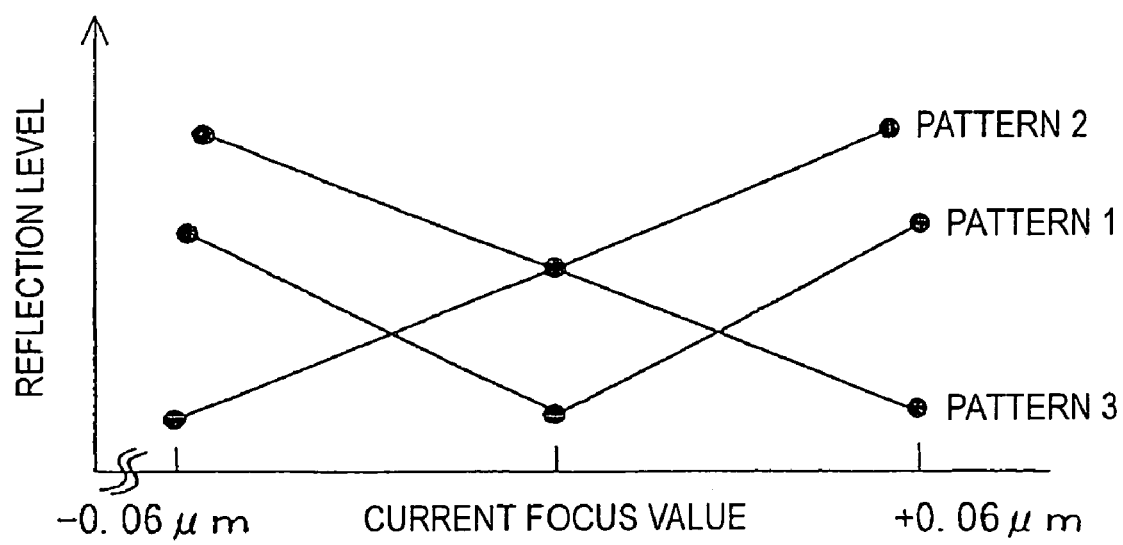
FIG. 10 shows quantities of reflected light obtained when the position of the focus of the objective lens is varied upward and downward relative to the optical disk surface in the embodiment of the invention.

After the tilt value correcting process is completed, the optical disk apparatus performs a process of correcting a positional shift of a point in focus on the optical disk. The process of correcting a positional shift of a point in focus between the optical disk and the objective lens will now be described with reference to FIG. 10. FIG. 10 shows quantities of reflected light obtained when the position of the focus of the objective lens is varied upward and downward relative to the optical disk surface in the present embodiment of the invention. The optical disk apparatus acquires a reflected light quantity A associated with the current focus value using an approach similar to that for the above-described tilt correcting process (S12). Next, the objective lens is moved upward by 0.06 μm, and a reflected light quantity B at this time is acquired using the approach similar to that for the above-described tilt correcting process (S13). The objective lens is then moved downward by 0.06 μm, and a reflected light quantity C at this time is acquired using the approach similar to that for the above-described tilt correcting process (S14). After the quantities of reflected light at the above-described three points are obtained, any positional shift of the point in focus is corrected based on data of each quantity of reflected light. First, when the value B is equal to or smaller than the value A as a result of comparison between the values A and B, the reflection has the pattern 3 shown in FIG. 10 which indicates that the objective lens approaches the position of the point in focus when moved upward by 0.06 μm. Then, a signal for moving the objective lens upward by 0.06 μm is output from the focus control unit 106 to the focus drive unit 107 (S15). When the value B is greater than the value A, the reflection has the pattern 1 or 2 (S16). Then, the value A and the value C are compared. When the value C is greater, the reflection has the pattern 1 which indicates that the current focus position is closest to the position of the point in focus. Then no correction is made (S17). When the value C is equal to or smaller than the value A, the reflection has the pattern 2 which indicates that the position of the point in focus is most closely approached when the objective lens is moved downward by 0.06 μm. Then, a signal for moving the objective lens downward by 0.06 μm is output from the focus control unit 106 to the focus drive unit 107 (S18).

Figure 12:
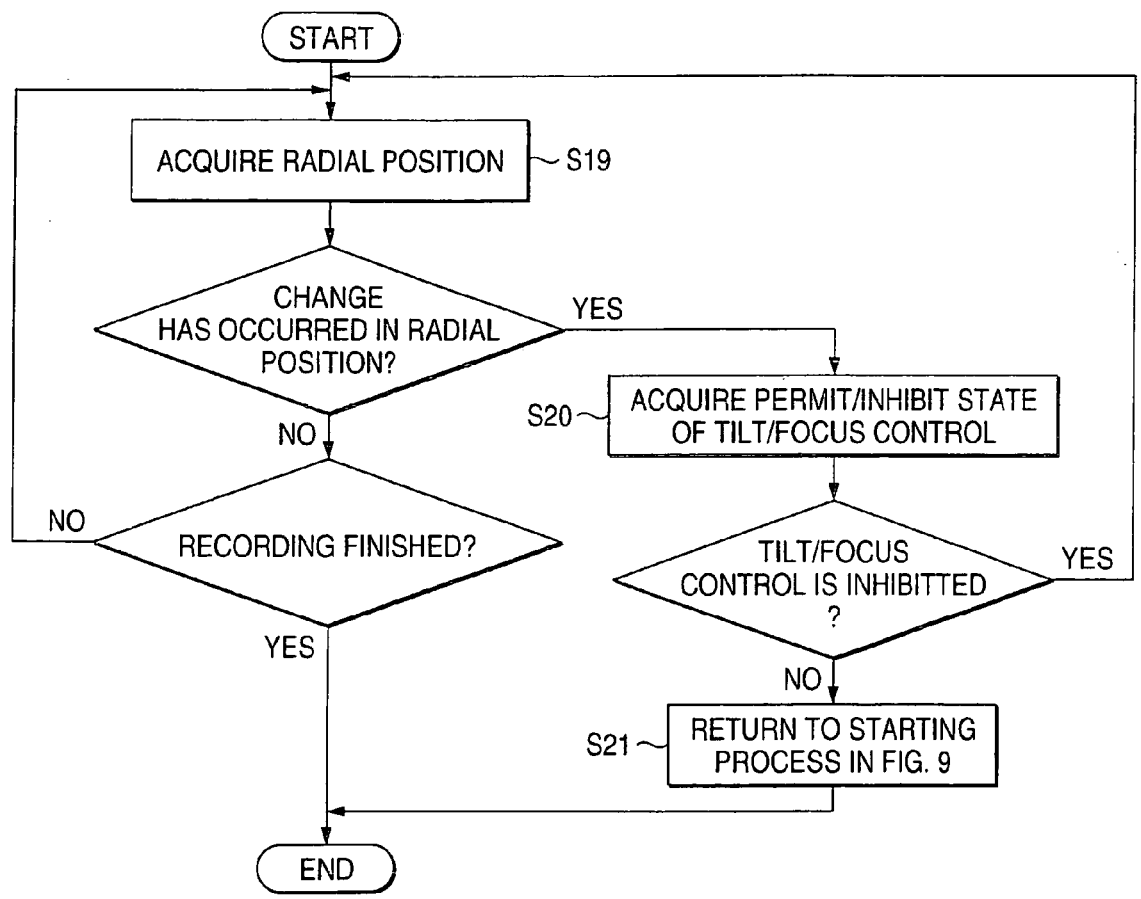
FIG. 12 is a flow chart showing a process of correcting the tilt of the objective lens relative to the optical disk to the perpendicular positional relationship again when there is a change of the radial position on the order of 1 mm according to the embodiment of the invention.
Figure 13:
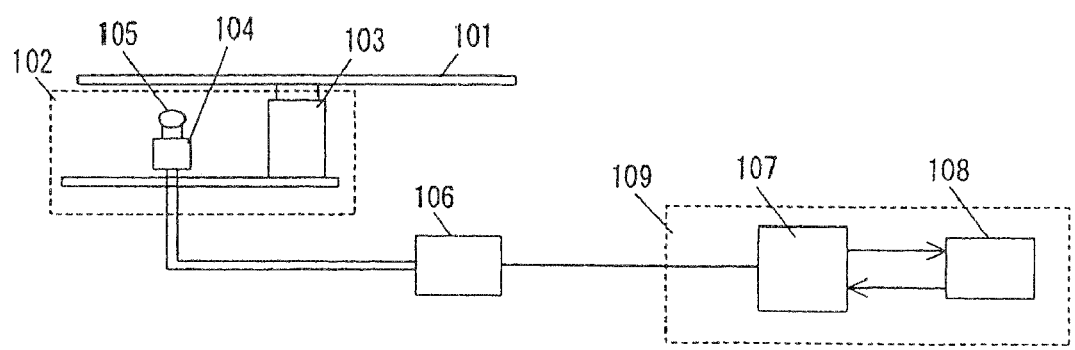
FIG. 13 is a block diagram showing tilt/focus control of an objective lens according to the related art.
Figure 14:
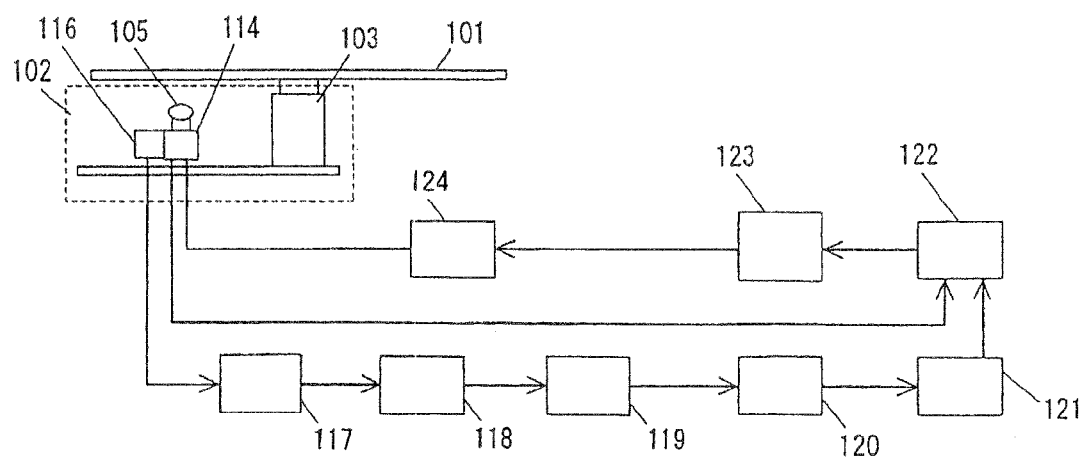
FIG. 14 is a block diagram showing laser control of an optical disk apparatus according to the related art.

Processing steps will now be described according to FIG. 12. FIG. 12 is a flow chart showing a process of correcting the tilt of the objective lens relative to the optical disk to the perpendicular positional relationship again when there is a change of the radial position on the order of 1 mm according to the present embodiment of the invention.

After the output to the focus drive unit is completed, the position under recording in the radial direction of the optical disk is acquired (S19). When a change on the order of 1 mm has occurred, reference is made to the identification table indicating permit/inhibit of the tilt/focus control associated with radial positions on the optical disk shown 15 to acquire permit/inhibit identification state of the tilt/focus control for the acquired position in the radial direction of the optical disk (S20). When tilt/focus control is inhibited, no tilt/focus process is performed. When tilt/focus control is permitted, the starting process in FIG. 9 is entered again (S21).

In this case, tilt/focus control is permitted throughout the data recording area when reference is made to the identification table of tilt/focus control. The optical disk apparatus proceeds to normal recording after performing the process of correcting the tilt of the objective lens relative to the optical disk surface and the process of correcting any shift of the position of the point in focus. When it is detected that the objective lens has moved 1 mm from the radial position on the optical disk where the above-described processes were performed for the last time, processes as described above are performed again.

Thus, the tilt and focus correcting processes are performed at each of the radial positions on the optical disk at 1 mm intervals. The result of the tilt correction is managed using a table at the storing unit 132 in the optical disk apparatus along with the temperature and the radial position at the time of the correction process, and the focus value is updated each time the process is performed.

Each time recording is completed, the temperature at the time of the end of recording is acquired in order to conduct temperature management through an operation as described below.

A description will be made on a case in which a reproduction operation follows the series of recording operations. After the series of recording operations is completed, the optical disk apparatus may be required to perform a process of reproducing the area which the apparatus itself has recorded. At this time, when the reproduction operation is performed immediately after the recording, there is substantially no change in the temperature inside the optical disk apparatus. Therefore, the reproduction operation at this time is performed by utilizing the result of correction of the position the point in focus performed during recording and by referring to the table of tilt correction results obtained during recording depending on where the reproduced position is located in the radial direction of the optical disk. Thus, optical disks represented by printable optical disks which are warped as a result of temperature changes can be always reproduced at an optimum tilt value.

A description will now be made on a case in which there is a temperature change when a reproduction operation is started after the recording operation for reasons including the time that passes between the operations. In this case, the optical disk apparatus checks the current temperature and where the reproduced position is located in the radial direction of the optical disk. It is then determined which of a tilt correction process during the recording operation and the full-surface tilt learning at the time of the activation process results in an optimum tilt value for the reproduced position. For example, let us assume that the position under the reproduction operation is a position at 40 mm in the radial direction of the optical disk. Also let us assume that the tilt value at the time of the full-surface tilt learning has been a tilt value A° and that the temperature at that time has been 25° C. Let us further assume that a tilt correction process performed in the 40 mm position during recording results in B° and that the temperature at that time is 50° C. The three items, 40 mm, B°, and 50° C. indicate the use of values managed in the table of the storing unit 132 in FIG. 1. Under such conditions, when the temperature at the beginning of the reproduction operation is 30° C., priority is given to the temperature 25° C. because 30° C. is closer to 25° C. than 50° C. That is, the value A obtained by the full-surface learning is used as the tilt value for reproduction in the 40 mm position at 30° C. When the temperature at the beginning of the reproduction operation is 40° C., priority is given to the result "B°" of the tilt correction process performed during recording because 40° C. is closer to 50° C. than 25° C. Thus, the tilt value that is more appropriate for the current temperature can be selected for the printable medium which is warped by a temperature change, which allows a stable reproduction operation.

A description will now be described on a case in which the optical disk apparatus performs an additional write operation on an optical disk on which recording has been once performed and which has not been removed and inserted thereafter.

When the optical disk apparatus performs an additional write operation on the optical disk on which recording has been once performed by the apparatus itself, the apparatus acquires the current temperature and checks where the starting position of the additional write is located in the radial direction of the optical disk. When the temperature at the time of the additional write differs by 10° C. or less from the temperature at the time when the previous recording was finished, it refers to the table for radial positions to find the result of tilt correction in the position that is closest to and inward from the radial position of the optical disk where the additional write is to be performed. Recording is then performed using the value as the initial value. When there is a temperature difference greater than 10° C., the result of full-surface tilt learning is used.

Whether to perform the tilt correction process and the point-in-focus correction process during recording at each radial position of an optical disk may be managed on a software basis. In the case of an optical disk which is not a printable medium and which has little or no warp, processing loads on the CPU may be reduced by performing the processes only in a part near the outer circumference of the disk.

With the above-described configuration, it is possible in an optical disk apparatus to prevent the positional relationship between an optical disk surface and the optical axis of the laser from shifting from perpendicularity when the quantity of a warp of the optical disk varies as a result of temperature rise, whereby the point in focus of laser light can be always located on a recording surface of the optical disk. It is therefore possible to prevent degradation of recording quality and a recording error that is caused by a failure in detecting an address on the optical disk during recording.

The invention may be applied to optical disk apparatus capable of recording and makes it possible to provide an optical disk apparatus and a method of recording using an optical disk apparatus having high reliability in writing.

This application is based upon and claims the benefit of priority of Japanese Patent Application No. 2004-017894 filed on Jan. 27, 2004, the contents of which are incorporated herein by reference in its entirety.

What is claimed is:

1. An optical disk apparatus for recording data on a recordable type optical disk utilizing a pattern of emission of a laser, said optical disk apparatus comprising:
   an objective lens that focuses laser light on the optical disk;
   a focus control unit that changes tilt value of the objective lens in the radial direction of the optical disk; and
   a reflected light measurement unit that measures a plurality of values of light quantity reflected on the optical disk, the plurality of values respectively corresponding to a plurality of the tilt values,
   wherein the focus control unit corrects the tilt value of the objective lens by setting the tilt of the objective lens to a tilt value corresponding to the smallest value of the light quantity measured by the reflected light measurement unit,
   wherein a process of tilting the objective lens so as to make the optical axis of the laser substantially perpendicular to the optical disk and a process of making the distance between the optical disk and the objective lens substantially equal to the focal length during recording are performed only in a data recording area of the optical disk by referring to a table for storing information on whether to permit or inhibit the process of tilting the objective lens relative to a position of the optical disk in the radial direction thereof so as to make the optical axis of the laser substantially perpendicular to the optical disk.

2. An optical disk apparatus according to claim 1, wherein reflected light from the optical disk under recording is received by the light-receiving unit and wherein a change in thermal efficiency of laser power during recording is detected from a change in the reflected light.

3. An optical disk apparatus according to claim 1, wherein the objective lens is tilted from the current state toward the outer circumference and inner circumference of the optical disk in the radial direction thereof during recording and wherein the quantity of a tilt of the optical axis of the laser relative to a surface of the optical disk is obtained from a change in reflected light at that time.

4. An optical disk apparatus according to claim 1, wherein the measurement of a change in reflected light during recording is performed by measuring reflected light within one turn of the optical disk to prevent misdetection of the reflected light attributable to a runout component of the optical disk.

5. An optical disk apparatus according to claim 1, wherein a change in reflected light from the optical disk under recording is detected and in which the quantity of a tilt of the objective lens relative to the radial direction of the optical disk is controlled such that the optical disk and the optical axis of the laser are in a substantially perpendicular relationship.

6. An optical disk apparatus according to claim 1, wherein a process of operating the objective lens to make optical disk and the optical axis of the laser closest to perpendicularity during recording is performed during a recording operation.

7. An optical disk apparatus according to claim 1, wherein the objective lens is moved from a predetermined state upward and downward relative to a surface of the optical disk during recording to obtain the distance between the surface of the optical disk and the objective lens from a change in reflected light during recording at that time.

8. An optical disk apparatus according to claim 1, wherein a change in reflected light from the optical disk under recording is detected to control the distance between the optical disk and the objective lens such that it substantially equals the focal length.

9. An optical disk apparatus according to claim 1, wherein a process of making the distance between the optical disk and the objective lens substantially equal to the focal length during recording is performed during a recording operation.

10. An optical disk apparatus according to claim 1, wherein a process of tilting the objective lens so as to make the optical axis of the laser substantially perpendicular to the optical disk and a process of making the distance between the optical disk and the objective lens substantially equal to the focal length are performed during recording at each predetermined interval in the radial direction of the optical disk.

11. The optical disk apparatus according to claim 1, further comprising:
   a temperature measurement unit that measures temperature,
   wherein the focus control unit corrects the tilt value of the objective lens according to the temperature measured by the temperature measurement unit.

12. An optical disk apparatus according to claim 1, wherein selection can be made on whether to perform a process of tilting the objective lens so as to make the optical axis of the laser substantially perpendicular to the optical disk and a process of making the distance between the optical disk and the objective lens substantially equal to the focal length at each predetermined interval in the radial direction of the disk.

13. An optical disk apparatus according to claim 11, wherein a process of tilting the objective lens so as to make the optical axis of the laser substantially perpendicular to the optical disk and a process of making the distance between the optical disk and the objective lens substantially equal to the focal length are performed during recording and wherein the result of the processes in the form of a table showing the value of a tilt and a temperature associated with a position of the disk in the radial direction thereof or the result of tilt value acquisition at the time of activation is selected when the optical disk apparatus performs a reproduction operation or an additional write operation depending on the temperature at that time.

14. An optical disk apparatus according to claim 1, the optical disk apparatus using a result obtained during recording by a process of making the distance between the optical disk and the objective lens substantially equal to the focal length when it starts a reproduction operation after finishing the recording.

15. An optical disk apparatus according to claim 11, wherein when a process of tilting the objective lens so as to make the optical axis of the laser substantially perpendicular to the optical disk and a process of making the distance between the optical disk and the objective lens substantially equal to the focal length are performed during recording, the value of a tilt associated with a position of the disk in the radial direction thereof and the temperature at that time are simultaneously acquired and stored in the form of a table.

16. The optical disk apparatus according to claim 1, wherein the focus control unit corrects the tilt value of the objective lens only in a data area of the optical disk.

17. A method for recording data on a recordable type optical disk utilizing a pattern of emission of a laser, said method comprising:
- (a) employing an objective lens to focus laser light on the optical disk;
- (b) controlling a focus of the laser light by changing a tilt value of the objective lens in the radial direction of the optical disk; and
- (c) measuring a plurality of values of light quantity reflected on the optical disk, the plurality of values respectively corresponding to a plurality of the tilt values, wherein in step (b) the tilt value of the objective lens is corrected by setting the tilt of the objective lens to a tilt value corresponding to the smallest value of the light quantity measured in step (c), and wherein a process of tilting the objective lens so as to make the optical axis of the laser substantially perpendicular to the optical disk and a process of making the distance between the optical disk and the objective lens substantially equal to the focal length during recording are performed only in a data recording area of the optical disk by referring to a table for storing information on whether to permit or inhibit the process of tilting the objective lens relative to a position of the optical disk in the radial direction thereof so as to make the optical axis of the laser substantially perpendicular to the optical disk.

* * * * *